Feb. 24, 1942.  C. W. FERREIRA  2,273,852
GAS GENERATOR
Filed Aug. 1, 1940
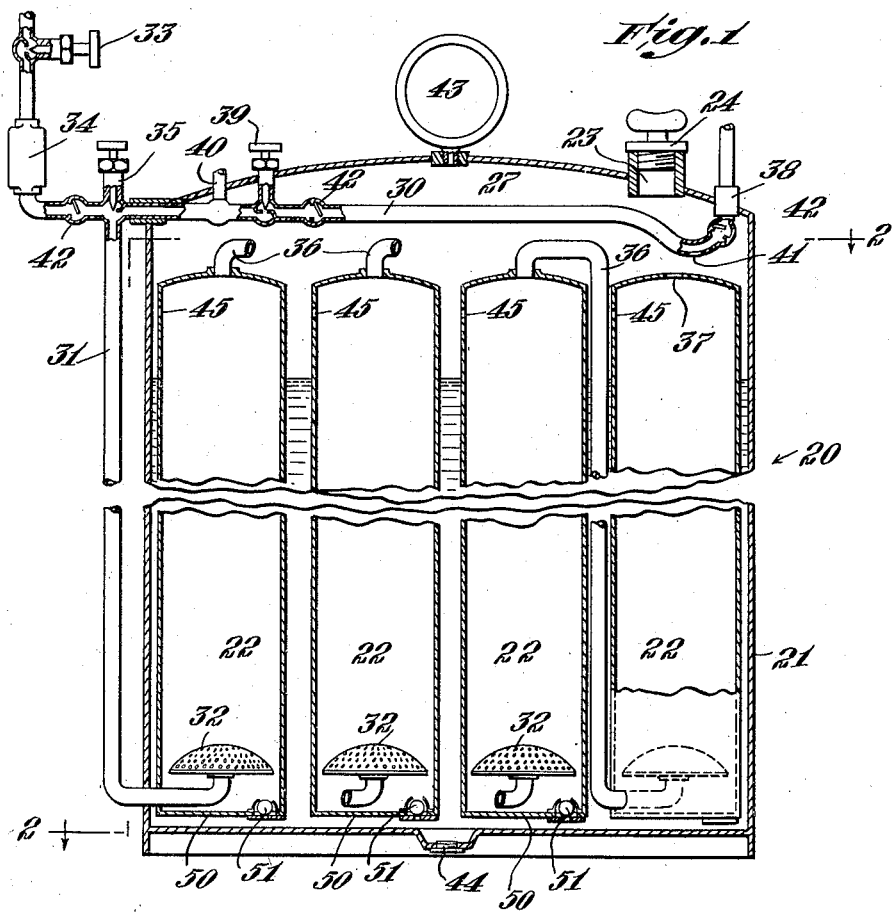
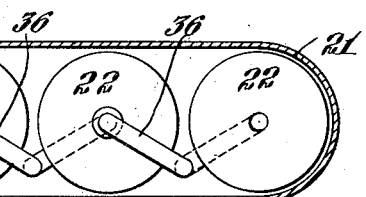
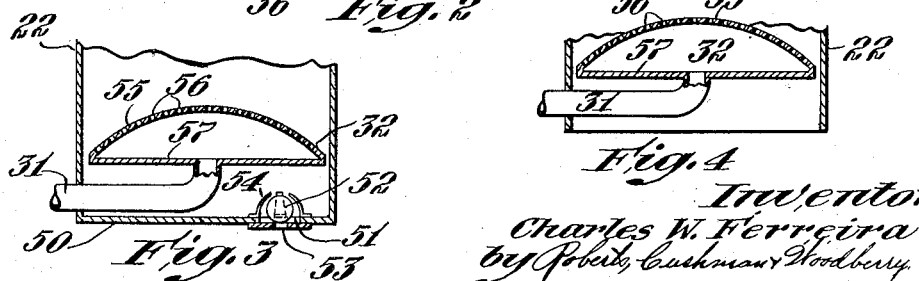
Inventor
Charles W. Ferreira
by Roberts, Cushman & Woodbury
Attys.

Patented Feb. 24, 1942

2,273,852

UNITED STATES PATENT OFFICE 2,273,852

GAS GENERATOR

Charles W. Ferreira, Miami, Fla., assignor to Pan-American Laboratories, Inc., Coral Gables, Fla., a corporation of Florida Application August 1, 1940, Serial No. 349,337

2 Claims. (Cl. 261—21)

This invention relates to an improvement in a gas generator and embodies a further development of the generator disclosed in my copending application Serial No. 278,804, filed June 13, 1939, of which this application is a continuation in part.

This generator is of the type wherein liquid fuel having volatile components is aerated by the introduction of air or gas or both and blends therewith to form a gas which may be used for various purposes. The air or the like, hereinafter referred to as a gaseous medium is introduced into the fuel under pressure and passes through the fuel in the form of fine bubbles which attract and absorb the volatile or gas emanating components of the fuel. This pressure is either positive or negative and it is understood that the term pressure is used herein in such general sense. In order to obtain a gas of the desired richness, the medium is passed through the fuel several times, the number of such passages depending upon the character of the fuel and the purpose to which the thus generated gas is to be put. The generator has numerous uses, for example, as the source of supply for a blowtorch or an internal combustion engine.

The primary object of this invention resides in the aeration of volatile fuel whereby all or as much as possible of the fuel treated is aerated continuously, not only when the fuel is fresh and contains a large percentage of highly volatile components, but also after such highly volatile components have been removed and the fuel embodies only less volatile components.

These and other objects will appear from a consideration of the following description of one embodiment of the invention adapted to handle gasoline or other liquid fuel and of the accompanying drawing of such embodiment, in which drawing Fig. 1 is a side elevation, partly in section, of a generator embodying this invention;

Fig. 2 is a sectional plan view taken along the line 2—2 of Fig. 1;

Fig. 3 is an enlarged sectional view of the lower part of an aerating tube showing in section the injector head; and Fig. 4 is a sectional view similar to Fig. 3 of another type of tube which may, if desired, be substituted for the tube shown in Figs. 1 and 3.

The illustrated generator 20 comprises a casing 21 within which are mounted a plurality of tubes 22 arranged in a series. The casing and tubes are partially filled with a liquid fuel such as gasoline or benzol which has volatile components. The fuel is introduced into the casing 21 through a filling tube 23 normally sealed by a cap 24.

The tubes 22 are of such dimensions as to substantially fill the lower portion of the casing, as shown in Fig. 2. Extending across the upper portion of the casing, hereinafter referred to as the reservoir 27, is a pipe 30 which terminates in an outlet 38. The pipe 30 is connected to the generator by a pipe 31 which leads to an aerator head or jet 32 mounted at the bottom of the first tube 22. A needle valve 33 and pressure control valve 34 regulate the entry of the medium into the pipe 30 and a needle valve 35 controls the diversion of a portion of the vehicle into the pipe 31. While for the sake of clarity the pipe 31, and valve 35 are shown in the drawing as outside the casing, it will be understood that they may be within the housing, the pipe being in the space between the first and second tubes of the series. As shown in Fig. 1, an aerator head or jet 32 is mounted at the bottom of each tube 22 and pipes 36 connect the top of each tube to the head 32 in the succeeding tube. The last tube 22 is connected to the reservoir 27 by a discharge vent 37.

The pipe 30 is also equipped with a valve 39 by which, as will be set forth below, the richness of the gas at the outlet connection 38 is controlled and with a safety valve 40 of any well known type which controls the pressure under which the air passing the valve 35 advances. Near the outlet 38 of the pipe 30 is an opening 41 into the casing 21 through which, as will be set forth below, the gas in the reservoir 27 enters the pipe. Check valves 42 installed at various points in the pipe 30 prevent any back flow of the medium. A pressure gauge 43 at the top of the casing indicates the pressure of the gas generated. A drain plug 44 permits the withdrawal of the fuel from the casing. Bleed holes 45 are provided in the walls of all tubes 22 except the last one of the series near the top thereof and above the normal level of the fuel in the casing act, as will be set forth below, to maintain the level of the fuel in the tubes substantially uniform with the level of the fuel in the casing when the generator is at rest or when it is, for any reason, agitated.

Each tube 22 of the preferred type of generator shown in Figs. 1, 2 and 3 is provided with a bottom plate 50 having a valve 51 therein. The valve 51 is of the unidirectional type which will permit the entry of fuel but will prevent its escape therefrom. The valve 51 shown in Fig. 3 comprises a ball 52 which normally seats upon and closes the port 53 in the plate 50 and a cage 54 which limits the raising of the ball to admit fuel into the tube. The head 32 is mounted as near the bottom of the tube 22 as possible and is of such cross-sectional dimensions that it substantially fills the tube. The top plate 55 of the head has a plurality of holes 56 therein through which the medium escapes in the form of fine bubbles into the fuel in the tube and aerates it.

Experience has demonstrated that in order to attain the greatest efficiency the bubbles by which the fuel is aerated must be relatively small or fine and should be so spaced apart that they do not come in contact with each other. If the bubbles do contact, they merge and form larger ones which are less efficient since the larger bubbles rise so rapidly in the fuel that they cause considerable turbulence and do not aerate it properly. The walls of the tubes 22 are preferably vertical so that the bubbles rising from the heads will have a clear passage through the fuel. By mounting the heads as near the bottom of the tubes as possible and by making the tubes vertical, the movement of the bubbles from the heads through the fuel is substantially unobstructed and turbulence resulting from such movement is held at a minimum. If the bubbles should touch the walls of the tubes or any obstructions therein they tend to adhere thereto and to remain in the path of succeeding bubbles with which they would merge to form large bubbles, and while such larger bubbles will eventually break away from the walls and rise, they will not function efficiently for the reason previously given.

The holes 56 are usually drilled or otherwise made in the plate 55 before it is domed. Consequently, in the finished head the axis of the holes are slightly inclined as shown in Fig. 3, such inclination gradually increasing as the distance from the center increases. By doming the plate 55 the bubbles rising from the head are more evenly spaced transversely of the tube and the medium stream from the pipe 31 and pipes 36 which strikes the portions of the plate between the holes is deflected at an angle against the lower plate 57 of the head and thence out through other openings either directly or after additional traveling between the plates 55 and 57.

The sizes and spacings of the holes 56 can, of course, be varied according to the sizes of the tubes and also to the amount of pressure, positive or negative, applied to the vehicle stream and the use to which the generator is to be put.

In the illustrated generator which is intended to supply a blow torch, the holes 56 are $10/1000''$ in diameter and are separated $3/32''$ apart on centers or $94/1000''$ apart on diameters. If the holes be larger or if the distance between them be decreased, the result will be the formation of larger bubbles due either to the increase in size of the holes or to the merging of the bubbles if the holes be too close together. For example, an increase to $35/1000''$ in diameter and consequent decrease to $69/1000''$ in separation on diameters gave a great increase in turbulence and a great decrease in efficiency. More specifically, the generator with the larger holes failed to function properly when the temperature decreased to 28° to 30° F. whereas the generator with the smaller holes did not fail even though the temperature decreased to 18° to 20° F. below zero.

Obviously the sizes of the holes 56 and the distances between them are influenced by the sizes of the generators including particularly the diameters of the tubes and heads. The goal sought is to make the holes in the heads of each generator of such size and to separate the holes by such distance that each generator will operate in the most efficient manner possible. The figures above given are merely illustrative of one typical installation wherein the generator is thirteen and a quarter inches high, nine and a quarter inches long and two and a half inches wide, and each tube is ten inches high and two inches in diameter, and while the holes so formed and spaced do in fact insure efficient operation of that generator, I am not to be limited thereto.

The casing, tubes and other parts of the generator are preferably of brass, except the valve balls 52 which are preferably of duraluminum for lightness. Not only do these metals avoid the danger of rust but they also prevent the formation of sludge when a leaded or ethyl gasoline is used for fuel. The pipes 31 and 36 are shown in the drawing as entering the tubes 22 through the walls thereof but, if desired, the pipes may enter through the bottom plates 50, it being essential that the pipes enter the tubes below the aerator heads 32 so that they do not obstruct or interfere with the passage of the aerating bubbles.

When the generator operates under positive pressure as when serving as a source of supply for a blowtorch, the medium forced into the inlet of the pipe is divided by the needle valve 35 into two streams, one of which is conducted by the pipe 31 to the aerator head 32 of the first tube. The pressure under which the medium is introduced is from 1 to 4 pounds per square inch under normal working conditions. The regulator valve when air is supplied from a high pressure line (usually 150 pounds per square inch) is set at 5 pounds per square inch and the safety valve 40 is set to release at 6 pounds per square inch.

The medium entering that head escapes through the holes 56 in the top plate 55 in the form of bubbles which rise through the fuel, absorbing volatile components thereof, and emerge from the upper level of the fuel into the top portion of the tube. The medium enriched by the volatile components then passes over into the second tube through a pipe 36 and finally reaches the upper portion of the fourth tube whence it rises through the vent 37 into the reservoir 27. The reservoir 27 is supplied with such enriched medium to which is added the vapors which rise directly from the fuel in the casing 21 surrounding the tubes 22.

The enriched medium in the reservoir 27 enters the pipe 30 through the opening 41 therein and mixes with the medium stream traveling therethrough. Since the opening 41 is the only outlet from the reservoir, the pressure under which the medium is forced through the tubes causes the enriched vehicle to enter the pipe 30. The medium flowing directly through the pipe 30 also acts by injection to draw the enriched vehicle from the reservoir. This mixture in the pipe is now supplied from the outlet 38 to a blowtorch or the like (not shown) by which the gas so generated is used.

When the generator is used as a source of supply of gas for an internal combustion engine or the like, the movement of the medium streams is the result of negative pressure or suction set up at the outlet 38. The suction exerted in the reservoir 27 acts first upon the top surface of the fuel in the casing 21 surrounding the tubes 22, then through the bleed holes 45 in the tubes and through the vent 37 in the last tube to initiate the movement of the medium stream through the tubes. In addition, the suction acts to initiate a direct flow of the vehicle through the pipe 30. The medium in the pipe 30 is mixed with the enriched medium in the reservoir 27 to form the gas required.

The bleed holes 45 act to relieve the pressure on the fuel in the tubes 22 so that the level of the fuel remains substantially uniform with the level of the fuel in the casing 21, more fuel being forced into the tubes by the pressure of the fuel in the casing outside the tubes 22 through the valves 51 in the bottom plates 50 each time the medium pressure is cut off or is reduced at the valve 35 or when suction ceases at the outlet 38. Physical agitation of the generator while in action sufficient to rock the valves 51 allows admission of fuel when required. In addition to the bleed holes 45 it is found to be of advantage when the generator is actuated by suction or negative pressure and is serving certain purposes to connect the opening 41 directly to the opening 37 in the top of the last tube rather than to draw the gas from the top of the fuel in the casing 21. When so doing, the last tube is provided with a bleed hole 45' somewhat larger than the bleed holes in the other tubes in order to avoid drawing the raw fuel too high in the tube due to the violent action of such fuel in that tube.

An essential feature of such generator is a constant supply of gas without failure due to poor fuel or to cold or other conditions especially after the more readily volatilized components of the fuel have been absorbed by the medium stream. All the fuel physically possible must be aerated by passing fine bubbles of the medium through the entire cross-section of the fuel. For this reason the heads 32 are mounted at the bases of the tubes and the bases of the tubes are mounted as near as possible to the bottom plate of the casing. The holes 56 in the head plates 55 are distributed so that the bubbles emanating therefrom travel through the entire cross-section of the fuel. In order that the aerating continue without interruption, the bleed holes 45 are provided to eliminate danger of air locks and to ensure a uniformity of fuel level when pressure or suction is shut off entirely or in part to permit fuel to flow into the tubes through the valves 51. Moreover, while the valves 51 admit fuel to the tubes 22, they are of such type that they oppose any escape of air, gas or fuel from the bottoms of the tubes.

In order to speed up the formation of gas by the generator, especially when poor fuels or fuels of the distillate type are employed, the medium before it is introduced into the pipes 30 and 31 may be heated in any well known manner.

It will be noted that in the operation of the generator as described the fuel in the casing is in circulation. Not only does the fuel pass the valves 51 when the generator is at rest or is physically shaken as stated above, but if the fuel in the tubes be aerated continuously for an extended period, its level will fall until the weight of the fuel outside the tubes is such that fuel is forced past the valves 51 into the tubes. The fuel thus entering the tubes mingles with the fuel in the tubes so that the mingled fuels are aerated, thus insuring a constant generation of gas.

If desired, the bottom plate 50, together with the valve 51, may be omitted so that the tubes 22 are open at the bottom and any sediment or the like which would collect therein passes out freely into the bottom of the casing. See Fig. 4. The omission of the plates 50 does not under normal conditions impair the operation of the generator as set forth above, but under certain abnormal conditions, as with fuels characterized by extreme lightness, the plates 50 and valves 51 are necessary.

While one embodiment of this invention has been shown and described, it will be understood that I am not limited thereto and that other embodiments may be made without departing from the spirit and scope of the invention. For instance, the number of tubes 22 may be increased or decreased, the casing and tubes may be changed in contour, or the tubes may be arranged other than in a straight line according to the requirements of the installation.

I claim:

1. A gas generator comprising a casing containing a quantity of liquid fuel having volatile components, a series of tubes vertically mounted in said casing, each tube being closed at its upper end, an aerator head in each tube at the lower end thereof, a pipe leading from the upper end of each tube, except the last in the series, to the aerator head of the next tube in the series, a discharge vent in the upper end of the last tube, and a pipe leading to the aerator head of the first tube in the series through which a gaseous medium is introduced under pressure, each tube being closed at the bottom and having a unidirectional valve therein which admits fuel into the tube but prevents the escape therefrom of fuel or vehicle.

2. A gas generator comprising a casing containing a quantity of liquid fuel having volatile components, a series of tubes vertically mounted in said casing, each tube being closed at its upper end, an aerator head in each tube at the lower end thereof, a pipe leading from the upper end of each tube, except the last in the series, to the aerator head of the next tube in the series, a discharge vent in the upper end of the last tube, and a pipe leading to the aerator head of the first tube in the series through which a gaseous medium is introduced under pressure, each tube being closed at the bottom and having a unidirectional valve therein which admits fuel into the tube but prevents the escape therefrom of fuel or vehicle, and having bleed holes above the level of the fuel therein.

CHARLES W. FERREIRA.